United States Patent

Marshall

[15] 3,683,506
[45] Aug. 15, 1972

[54] NAVIGATIONAL TRAVEL TIME COMPUTER

[72] Inventor: John Marshall, 1228 N. Quantico St., Arlington, Va. 22205

[22] Filed: June 19, 1970

[21] Appl. No.: 47,794

[52] U.S. Cl. .................................................33/76 R
[51] Int. Cl. .................................................B43l 13/02
[58] Field of Search............33/76, 75, 104, 111, 79 A

[56] References Cited

UNITED STATES PATENTS

| | | | |
|---|---|---|---|
| 2,554,449 | 5/1951 | Shipps | 33/111 |
| 1,497,492 | 6/1924 | Engel | 33/111 |
| 2,352,405 | 6/1944 | Polowe | 33/104 |
| 2,223,428 | 12/1940 | Slauson | 33/79.4 |

FOREIGN PATENTS OR APPLICATIONS 565,953  12/1944  Great Britain.............33/79 A

*Primary Examiner*—Harry N. Haroian
*Attorney*—Wenderoth, Lind & Ponack

[57] ABSTRACT

A computer scale member has a wind or current triangle scale based on a standard navigational scale on one edge thereof. The member also has a plurality of travel time scales based on travel time at predetermined speeds. At one end of the member is a hole and a compass index around the hole. A clamping device releasably clamps the member to a clamping section on the free end of a lost motion arm mechanism, the other end of which is attached to a map supporting surface.

15 Claims, 5 Drawing Figures

Patented Aug. 15, 1972

INVENTOR
JOHN MARSHALL

BY Wenderoth, Lind & Ponack
ATTORNEYS

Patented Aug. 15, 1972

INVENTOR
JOHN MARSHALL

BY *Wenderoth, Lind & Ponack*

ATTORNEYS

Patented Aug. 15, 1972

INVENTOR
JOHN MARSHALL

BY *Wenderoth, Lind & Ponack*

ATTORNEYS

Patented Aug. 15, 1972

INVENTOR
JOHN MARSHALL

BY *Wenderoth, Lind & Ponack*

ATTORNEYS

NAVIGATIONAL TRAVEL TIME COMPUTER

BACKGROUND OF THE INVENTION

The present invention relates to a travel time computer for use in aerial and nautical navigation.

More particularly, the present invention relates to such a device by the use of which the effects of wind or currents may be readily computed and the estimated travel time may be simply determined.

Even more particularly, the present invention relates to such a device by the use of which the estimated travel time might be checked during travel.

Yet more particularly, the present invention relates to such a device which is portable and extremely simple to use.

An important determination to be made in aerial and nautical navigation is the estimated time of travel. It is not possible to make this determination by merely considering the distance and fixed speed of the craft. This is due to the effects of wind currents. For instance, a head wind will slow a craft down, and a tail wind will speed a craft up. Similarly, a side wind would veer the aircraft off course. Thus, in the case of a head wind or tail wind, the effective travel time (the ground speed of the aircraft) would be less or greater, respectively than that computed. In the case of a side wind, the aircraft would never reach the destination, but would rather pass by the destination on either side. Water currents have similar effects on water craft.

A great many systems have been developed to account for the effects of wind and currents to enable an operator of an aircraft or watercraft to accurately estimate travel time. However, none of these systems have been entirely successful for numerous reasons. These prior systems have required numerous manipulations and calculations to determine estimated travel time. Particularly in the case of a small aircraft or watercraft, the operator does not have time to check these calculations during travel. Due to this complexity operators in many cases just simply never make the calculations and rely upon noticing landmarks and their judgement to determine the proper course and estimate the length of travel time. However, the disadvantages and dangers of such practice are manifest. A mistake in judgement or an error in recognizing a landmark may result in the operator becoming hopelessly lost.

With this background in mind, it is a primary object of the present invention to provide a travel time computer for use in either aerial or nautical navigation which may very easily be used to determine estimated travel time.

It is a further object of the present invention to provide such a device which may be easily used during travel to check on the estimated travel time.

It is a yet further object of the present invention to provide such a device which is portable and compact and very simple to use.

It is still a further object of the present invention to provide a simplified modification for use in determining and checking on the estimated travel time.

These objects are achieved in accordance with the present invention by the provision of a novel computer which is made portable and compact. A portable clipboard is provided with a lost motion arm mechanism thereon. Movably mounted on the end of the lost motion arm mechanism is a novel computer scale member. At the end of the computer scale member which is movable mounted on the lost motion arm mechanism is a double compass bearing index for use in plotting a wind or current triangle. On one edge of the computer scale member is a novel wind triangle scale which is miniaturized and based upon some standard scale such as the Sectional Aeronautical Chart scale. Also on the computer scale member are a series of travel time scales based upon increments of ground speed and having indicia in travel time. Conveniently, all of the above scales and indexes appear on both sides of the novel computer scale member. In a simplified modification of the present invention, a computer including only the travel time scales is provided.

Other objects and features of the invention will be made clear by the following description taken together with the accompanying drawings.

BRIEF DESCRIPTION OF THE DRAWINGS

with reference now to the drawings, the novel travel time computer will be described in detail. In FIG. 1 the computer is generally indicated by the reference numeral 1 and includes a portable clipboard having a backing plate 2 and a cover plate 3. Cover plate 3 is attached to and adapted to be folded over backing plate 2 by any suitable means such as creased portion 4. On one edge of backing plate 2 is mounted a lost motion arm mechanism 5 by a suitable bracket 6. Bracket 6 has a raised level 7 at the connection of the lost motion arm mechanism 5 such that the mechanism 5 is slightly raised above the surface of the backing plate 2. The principle of operation of a lost motion arm mechanism is well known. Therefore, a detailed description of this mechanism will be dispensed with herein. However, the purpose of the lost motion arm mechanism is to move a straight edge anywhere over a surface while always maintaining the edge parallel to its original position.

Figure 1:
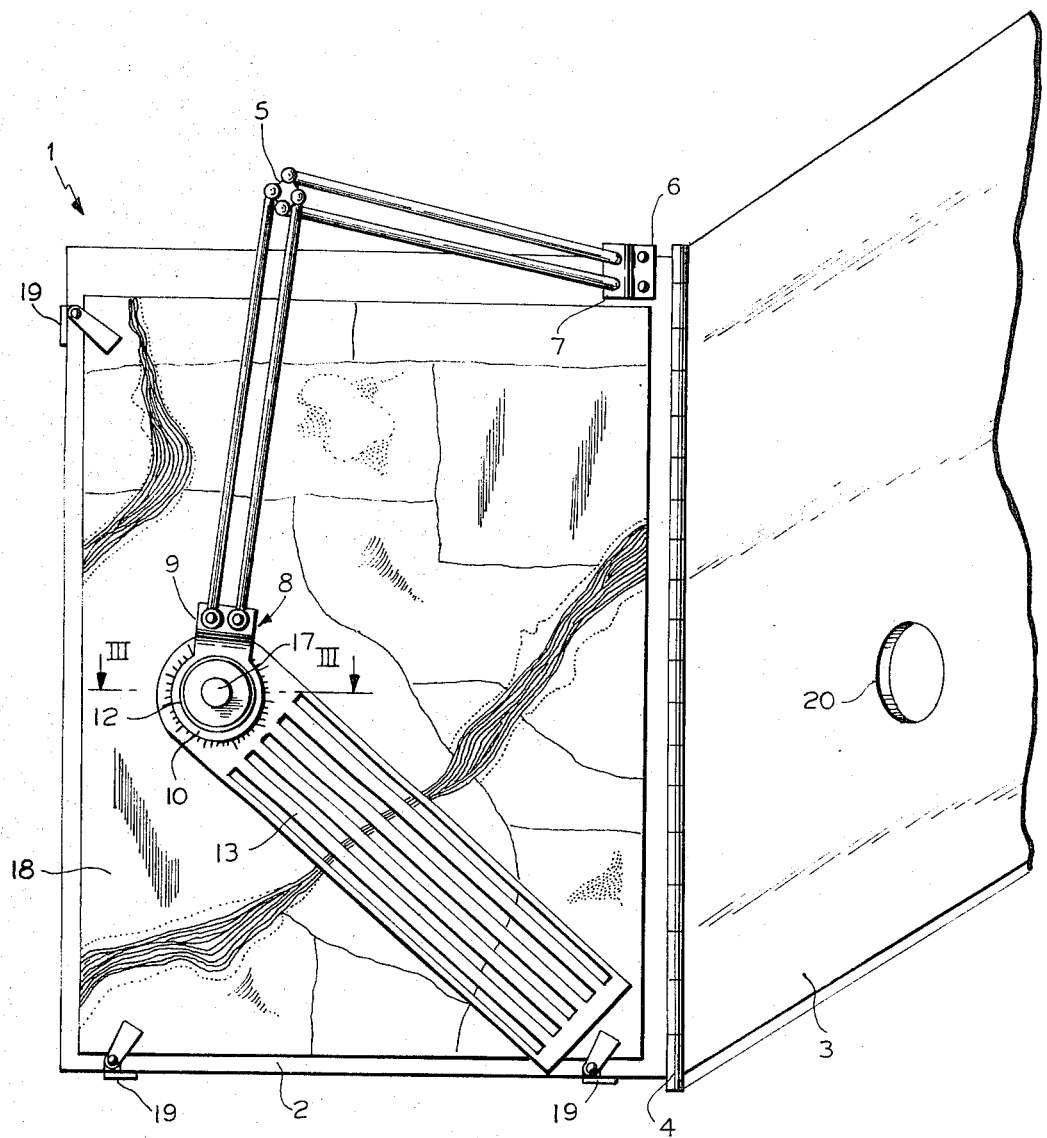
FIG. 1 is an elevational view of a preferred embodiment of the present invention.

The lost motion arm mechanism 5 is connected at the free end thereof with a computer scale member bracket 8. The computer scale member bracket 8 has a raised portion 9 at the area of connection with the lost motion arm mechanism 5 to insure that the mechanism 5 is slightly raised above the surface of the backing plate 2. The computer scale member bracket 8 has a generally circular clamping section 10. A hole 11 is centrally located within the clamping section 10. Around the upper outer periphery of clamping section 10 is positioned a marking surface 12, the purpose of which will be described in more detail below.

Figure 3:
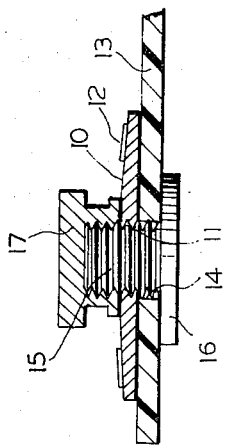
FIG. 3 is a cross-sectional view taken along line III—III in FIG. 1.

A computer scale member 13 having a centrally located hole 14 on one end thereof is adapted to be clamped to clamping section 10. As shown in FIG. 3, a threaded clamping bolt 15 having a supporting flange 16 thereon is inserted through holes 14 and 11. A nut 17 screws on to bolt 15 to hold clamping flange 10 and computer scale member 13 in place together. As will be apparent from FIG. 3, computer scale member 13 is movably mounted upon the loosening of nut 17.

A suitably scaled aerial or nautical map 18 is adapted to be positioned on backing plate 2 by any desirable or suitable clamping arrangement. It has been found that a particularly effective and convenient arrangement may be provided by large clips such as illustrated by reference numerals 19 in FIG. 1. Cover plate 3 has a suitably located opening 20 therein which is adapted to receive nut 17 when the cover plate 3 is folded over backing plate 2. Thus, it will be seen that the assembly illustrated in FIG. 1 provides a compact and portable navigational computer.

Figure 2:
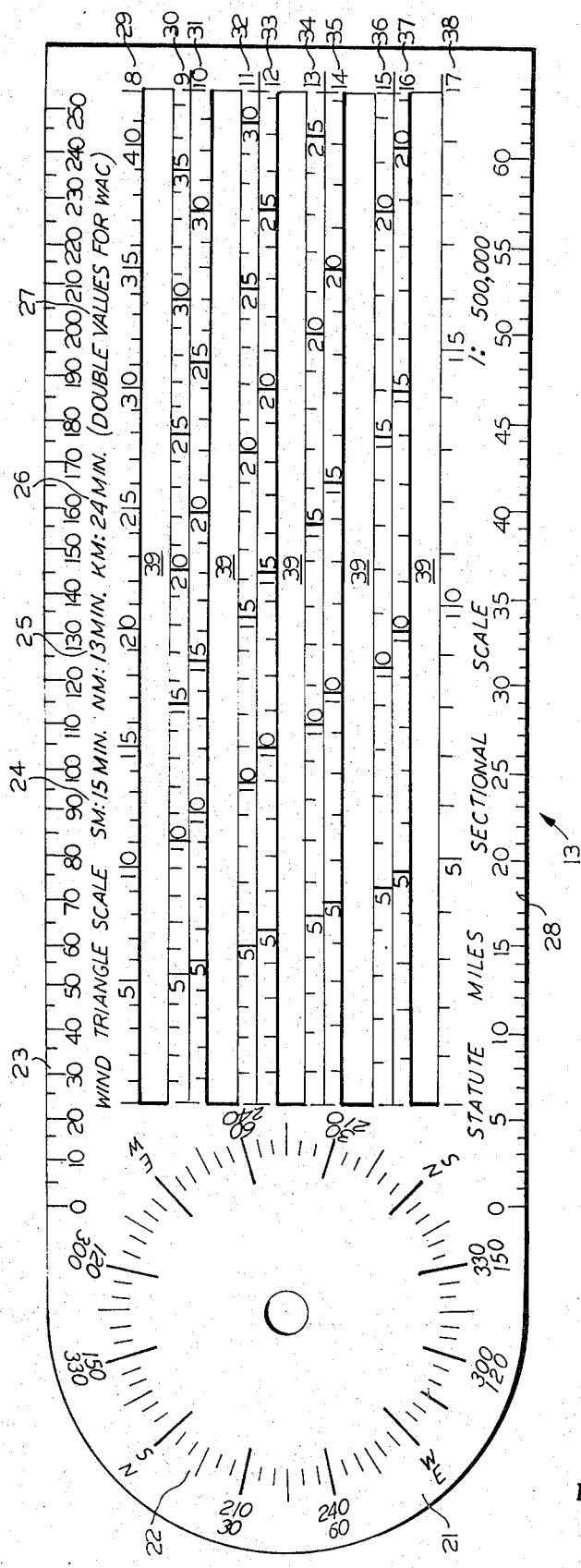
FIG. 2 is an enlarged plan view of the computer scale shown in FIG. 1.

With reference now to FIG. 2 of the drawings, the computer scale member 13 will be described in more detail. Computer scale member 13 is generally in the form of a rectangle. As previously mentioned, an opening 14 is centrally located in one end of the scale for attachment to clamping section 10 of the lost motion arm mechanism 5. If desired the end of the scale member may be rounded as at 21. A double compass index 22 is provided annularly around opening 14 in such a manner that it is visible around clamping flange 10 when the computer scale member 13 is clamped thereto. A single compass index may be provided rather than a double compass index. However, it will be manifest that the provision of a double compass index provides for more convenience of operation of the computer device.

A wind or current triangle scale 23 is provided on one longitudinal edge of computer scale member 13. Triangle scale 23 is conveniently miniaturized and conveniently based on some other standard scale. In the embodiment shown in FIG. 2, wind triangle scale 23 is based on the Sectional Aeronautical Chart scale (statute or sectional scale). Further, in the embodiment shown in FIG. 2, wind triangle scale 23 is miniaturized such that one increment thereof is one-fourth the size of the same increment on the Sectional scale. Suitable indicia 24, 25, 26 and 27 are provided in close relationship to wind triangle scale 23 for use in a manner to be described in more detail below. On the opposite longitudinal edge of computer scale member 13 may be conveniently provided a Sectional Aeronautical Chart scale 28.

Between wind triangle scale 23 and Sectional Aeronautical Chart scale 28 are provided a plurality of travel time scales 29–38. Scales 29–38 are based upon various ground speeds (in the case of aerial navigation, or effective speeds in the case of nautical navigation) such as 80 mph, 90 mph, 100 mph....170 mph. These values are indicated on the right hand ends of the scales as viewed in FIG. 2. The indicia on each of the scales 29–38 are increments such as minutes of travel time. For instance, in scale 29, the increment indicated by 5 represents 5 minutes of travel time at a ground speed of 80 mph. As will be apparent, the lengths on the scales of the increments of time become increasingly longer as the ground speeds increase.

Conveniently, slots 39 may be provided between pairs of the travel time scales to facilitate marking and computation with regard thereto. Alternatively, holes could be provided at each end of scales 29–38 to facilitate marking.

In a preferred embodiment of the present invention the computer scale member 13 consists of a clear flexible plastic material with the various indicia and scales printed thereon in a suitable manner. However, it is to be understood that the computer scale member 13 may be made of any suitable or desirable material, such as aluminum, steel, fiberboard etc.

Furthermore, it is to be understood that it is within the contemplation of the scope of the present invention that the reverse side (not shown) of computer scale member 13 contains additional incremental travel time scales. For instance, the reverse side of computer scale member 13 shown in FIG. 2 could contain additional travel time scales based on ground speeds of from 180 mph to 270 mph. The reverse side of the computer scale member 13 would also contain a duplicate compass index 22, wind triangle scale 23, indicia 24–37, and Sectional Aeronautical Chart scale 28.

Although the above-described preferred embodiment of the present invention has shown 10 travel time scales on each side of the computer scale member 13, it is to be understood that it is considered to be within the scope of the present invention to provide a greater or lesser number of such scales. It is to be further understood that although in the preferred embodiment the travel time scales have been computed in ground speed increments of 10 mph, it is contemplated that other increments can be used. For instance, if the aircraft or watercraft is relatively slow, it may be desirable to use smaller increments. However, if the craft is relatively fast, it may be desirable to use relatively larger increments.

Figure 4:
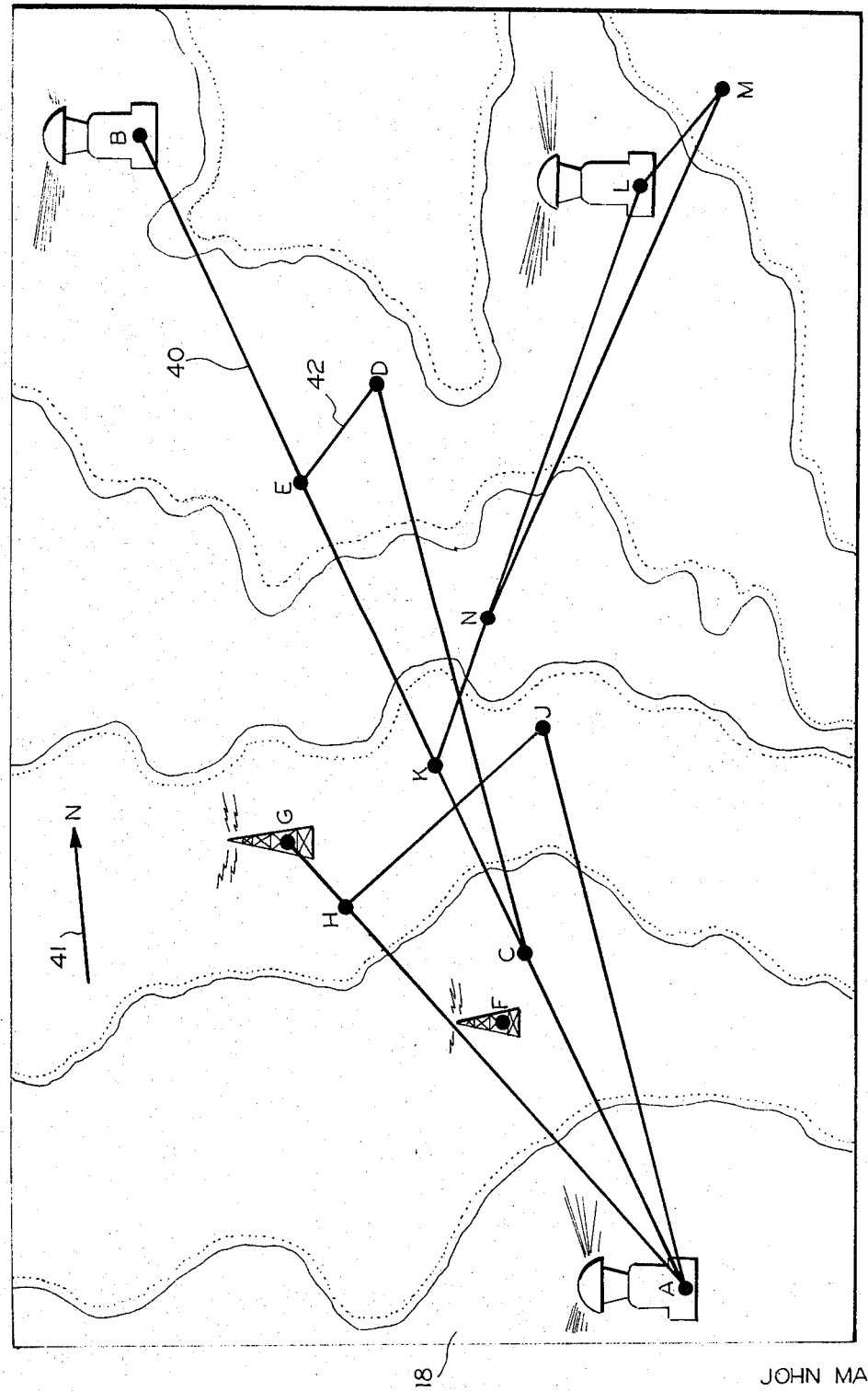
FIG. 4 is a plan view of a navigational chart showing wind triangle and estimated travel time computations using the device of FIG. 1.

With reference now to FIG. 4 of the drawings, the computations possible with the device shown in FIG. 1 will be described. For purposes of clarity, the various positions of the computer itself, have been eliminated from FIG. 4.

A suitable map such as map 18 is positioned on the backing plate 2 by means such as clamps 19. Assume that the operator of the craft wishes to travel from point A to point B, for instance two airports. A line 40, which represents the actual course of travel, is drawn between points A and B. Nut 17 is loosened, such that computer scale member 13 is movable. One edge of the scale is then aligned with a convenient compass rose or meridian 41 on the map. The nut 17 is then tightened so that computer scale member 13 is rigidly secured. Marking surface 12 is marked at North as indicated on compass index 22. Alternatively, marking surface 12 may be replaced by a movable pointer which may be mounted for movement around the periphery of clamping section 10.

Assume that the wind speed information available indicates that the wind is 30 mph (statute miles) from the northeast. Since northeast represent 45° on the compass, nut 17 is loosened and computer scale member 13 is turned until 45° on the compass scale 22 is aligned with the previously made mark on marking surface 12. Nut 17 is then clamped such that computer scale member 13 is secure. The zero point on the wind triangle scale 23 is then aligned anywhere along course line 40. Since the wind is indicated as 30 mph a wind vector of 30 on the wind triangle scale 23 is drawn in the direction of the name of the wind, i.e. northeast. Wind vector 42 represents the effect of the wind upon the course of the craft.

Next assume that the given air speed of the aircraft is 135 mph. The nut 17 is loosened and the wind triangle scale 23 is positioned such that the zero point thereof intersects course line 40 in the general direction of starting point A and the 135 point intersects the end of wind vector 42 or vice versa. These points are indicated as C and D, respectively, in FIG. 4. The vector CE represents both the flying time in 15 minutes and the effective ground speed along course line 40. This is true since the wind triangle scale 23 has been miniaturized to one quarter of the Sectional Aeronautical Chart scale (statute miles). Thus, for convenience, computations based on the wind triangle scale 23 are one quarter the size of computations which would be based on statute miles. Also, time computations are accordingly based on miles per quarter hour (15 minutes). It is to be understood, however, that the wind triangle scale could be based upon any other fraction of, or could be the same as the Sectional Aeronautical Chart or any other suitable chart.

If it is desired to know the ground speed of the craft, this may be readily determined by measuring vector CE along the wind triangle scale. When this is done, it is found that the ground speed is approximately 120 mph. This can be verified by measuring vector CE on the 120 mph travel time scale. When this is done, it is found that the length in time of vector CE corresponds approximately to 15 minutes. Alternatively, the ground speed might be determined merely by quickly comparing the length of vector CE with the various travel time scales and aligning the vector with the scale which most nearly aligns with 15 minutes.

Once the proper travel time scale has been determined, it will be readily apparent that the total estimated travel time between points A and B may be readily determined. This is done by measuring course line 40 along the determined travel time scale and reading the estimated travel time in minutes. When this is done with regard to the above described example, using the 120 mph travel time scale, it will be found that it will take approximately 37 minutes to travel from point A to point B.

The purpose of indicia 24–27 of FIG. 2 will now be more apparent from the above discussion. Indicia 24 states that when using the scales described with wind and air speed information in terms of statute miles, the measurement of vector CE will be 15 minutes of travel time. Indicia 25 indicates that the same vector will indicate 13 minutes of travel time if wind and air speed information are in nautical miles. Indicia 26 indicates that vector CE will measure 24 minutes of travel time when the air speed and wind information are in kilometers. Indicia 27 merely indicates that the indicia 24 through 26 should be doubled when the map is to the WAC scale (World Aeronautical Chart). Since the statute miles scale and the WAC scale are the two most commonly used, indicia 24–27 should cover most common uses. However, it is to be understood that the scope of the present invention contemplates the use of other scale maps. For instance, in nautical navigation, a great many varying scaled maps are available.

It is also to be understood that the assembly of FIG. 1 can be used for other common navigational purposes. For instance, it will be apparent that nut 17 may be tightened when one edge of computer scale member 13 is aligned with vector CD, and the compass index may be read at the point which was previously marked on marking surface 12. This compass reading will indicate the bearing or direction which the craft should be headed to travel over course line 40.

The computer scale member 13 may also be used during travel to check on the estimated travel time. For instance, the operator travelling along course 40 knows that he will pass closely by a particular landmark F. This landmark might be any easily recognized fixture such as a bridge, a radio tower, a water tower, etc. The operator need only record the travel time between starting point A and check point F or between any two points. If this travel time is for instance 10 minutes, the operator need merely compare the various travel time scales to find the one in which a travel time of 10 minutes aligns between points A and F along course line 40. In the above example, this travel time scale is the 110 mph scale. Thus, the operator has determined his ground speed as 110 mph. The operator may then use this scale to measure the travel time between starting point A and destination point B. When this is done, the operator will determine that his estimated flight time between points A and B will be approximately 40 minutes. If the operator had made a preflight estimation as previously discussed and determined that his estimated travel time would be 37 minutes, he now realizes that he is flying into a stronger wind. This results in a lower ground speed and a longer travel time.

The device of the present invention may also be used by an operator during travel to correct for an incorrect bearing due to, for instance, incorrect wind information. For instance, the operator intending to fly over course line 40 might discover after a given period of time, such as 17 minutes, that he is in fact flying over a recognizable landmark G. He then knows that his actual course line is along AG. The operator then compares line AG with travel time scales 29–38 to determine which corresponds to a travel time of 17 minutes. In the above example, this is the 120 mph scale. A vector AH, corresponding to 15 minutes on the 120 mph scale is then marked off along line AG. The operator then draws a course bearing line through point A which is parallel to vector CD. Along this bearing line is marked a vector AJ representing an airspeed of 135 mph. Vector HJ then represents the actual wind vector encountered. The length of wind vector HJ may be measured along wind triangle scale 23. When this is done, it is found that the wind has a velocity of approximately 63 mph. The direction of the wind may be measured from the compass index. This wind information may then be used as previously described to recalculate a wind triangle and to determine estimated travel time between points G and B. Thus, it will be seen that by the provision of applicant's novel device flight corrections may be very readily made during travel.

The device of the present invention may also be used during travel for navigational calculations necessitated by a change in destination. For instance, when the operator has reached point K along course line 40, it may for one reason or another be necessary to change his destination, for instance to airport L. Using the previously available wind information, wind vector LM is plotted. Since the air speed remains 135 mph, wind triangle scale 23 is placed such that the 135 point intersects the end of wind vector LM, and the zero point intersects course line KL. Vector NL then represents 15 minutes of flying time. When vector NL is measured along wind triangle scale 23, it is found that the ground speed is 105 mph. Since the device illustrated has no 105 mph travel time scale vector KL is measured along both the 100 mph and the 110 mph travel time scales. When this is done, it is found that vector KL measures 21 minutes on the former and 19 minutes on the latter. Therefore the estimated travel time between points K and L will be approximately 20 minutes.

Thus, it will be apparent that changes in course during travel may easily be accommodated and plotted with the device of the present invention.

It will be even further apparent to those skilled in the art that a great many other and additional navigational calculations may be made by the employment of applicant's computer device.

Figure 5:
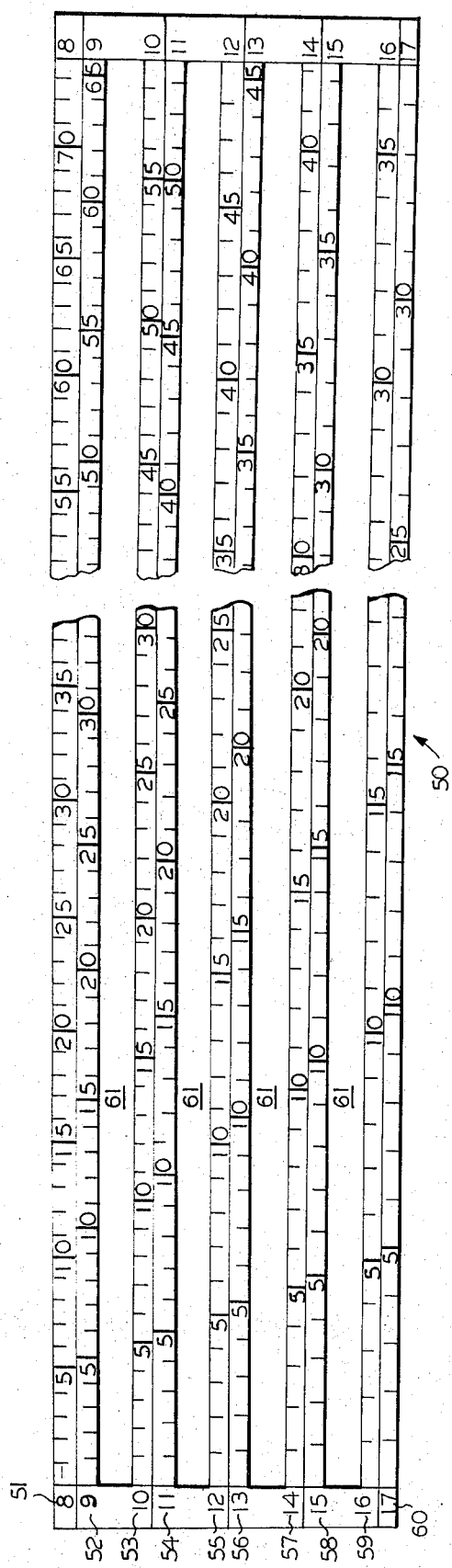
FIG. 5 is a plan view of a simplified modification of the estimated travel time computer in accordance with the present invention.

With reference now to FIG. 5 of the drawings, a simplified embodiment of the computer device of the present invention will be described. A computer scale member 50 includes a plurality of travel time scales 51-60 on one side thereof. In the example shown, scales 51-60 correspond to scales 29-38 of the embodiment shown in FIG. 2. That is, the scales 51-60 are based upon ground speeds of 80 mph, 90 mph, ... 170 mph. A reverse side of computer scale member 50 may likewise have further travel time scales. For instance, the reverse side of computer scale member 50 might have travel time scales based on ground speeds of from 180 mph to 270 mph. It will be noted that the length of travel time scales on computer scale member 50 are longer than the lengths of travel time scales 29-38 on computer scale member 13 shown in FIG. 2. However, it is to be understood that the lengths of the travel time scales on both computer scale members 50 and 13 may be made longer or shorter, depending upon convenience and space considerations. Computer scale member 50 may conveniently have holes or slots 61 between the travel time scale. The slots 61 are similar to the slots 39 on computer scale member and allow access of a pencil or other instrument with regard to each of the travel time scales. In the preferred embodiment, computer scale member 50 is made of a clear, flexible plastic material, and the various scales and indicia are printed thereon. However, it is to be understood that computer scale member 50 may be made of any suitable or desirable material such as aluminum, stainless steel, etc.

Computer scale member 50 is used to check on travel time in the same manner as discussed above with regard to scale member 13.

In the above examples, the present invention has been discussed with regard to aerial navigation. However, it is to be understood that the device is equally applicable to nautical navigation. The speed of the boat would of course be sustituted for air speed. Additionally, tide and water current information would be substituted for wind information. Also, the increments of the travel time scales would be much smaller.

It will be apparent that a greatly simplified navigational computer has been provided. The device has application both in aerial and nautical navigation. The device is compact and portable and is thus suitable for a small aircraft or watercraft. In addition, the device is extremely simple to use and operate. This is of great importance in an aircraft or watercraft operated by only one person. The operator need devote only a very few brief moments during travel to check on estimated travel time. In addition, such operators will be encouraged to use the device of the present invention in pretravel calculations due to its simple nature and lack of complexity.

Although preferred embodiments of the invention have been described in detail, such description is intended to be illustrative only and not restrictive, since many details of the construction of the invention may be altered or modified without departing from the spirit or scope thereof.

What is claimed is:

1. A navigational computer comprising a mounting surface adapted to have a map positioned thereon; a computer scale member; and means for mounting said computer scale member for movement over said map; said computer scale member having a wind or current triangle scale thereon, said wind or current triangle scale including indicia having a predetermined relationship to a standard navigational chart scale, and a plurality of travel time scales thereon, each of said travel time scales having indicia representing time of travel at a different predetermined speed, said wind or current triangle scale and said travel time scales being dimensioned such that an increment on said wind or current triangle scale corresponds to a predetermined length of time on said travel time scale corresponding to said increment on said wind or current triangle scale.

2. A navigational computer as claimed in claim 1, further comprising a portable clipboard having a backing plate and a cover plate attached to said backing plate, said mounting surface being said backing plate, and means for selectively folding said cover plate over said backing plate.

3. A navigational computer as claimed in claim 2, wherein said mounting means comprises a lost motion arm mechanism, a bracket mounting said lost motion arm mechanism on said backing plate, and a computer scale member bracket releasably attached to said computer scale member, said bracket and said computer scale member bracket each having raised levels thereon to raise said lost motion arm mechanism above said map.

4. A navigational computer as claimed in claim 3, wherein said computer scale member has a central hole through one end thereof, and said computer scale member bracket comprises a generally circular clamping section having a central bore therethrough, a bolt adapted to extend through said bore and said hole, and a nut adapted to selectively clamp said computer scale member to said clamping section.

5. A navigational computer as claimed in claim 4, further comprising a marking surface adjacent the periphery of said clamping section and a compass index annularly located around said hole, whereby said index is visible when said computer scale member is clamped to said clamping section.

6. A navigational computer as claimed in claim 5, wherein said compass index is a double index.

7. A navigational computer as claimed in claim 4, further comprising a movable pointer mounted for movement around the periphery of said clamping section and a compass index annularly located around said hole, whereby said index is visible when said computer scale member is clamped to said clamping section.

8. A navigational computer as claimed in claim 7, wherein said compass index is a double index.

9. A navigational computer as claimed in claim 1, wherein said standard navigational chart scale is the Sectional Aeronautical Chart scale.

10. A navigational computer as claimed in claim 7, wherein said predetermined relationship is such that the length of an increment of said wind triangle scale equals one-fourth the length of such increment on said Sectional Aeronautical Chart scale.

11. A navigational computer as claimed in claim 1, wherein said predetermined speeds are gound speeds.

12. A navigational computer as claimed in claim 1, further comprising a plurality of slots through said computer scale member between pairs of said travel time scales.

13. A navigational computer as claimed in claim 1, further comprising a plurality of holes through said computer scale member at the ends of said travel time scales.

14. A navigational computer as claimed in claim 1, further comprising a second plurality of travel time scales on the side of said computer scale member opposite said plurality of travel time scales.

15. A navigational computer as claimed in claim 1, wherein said computer scale member consists of a clear, flexible plastic material.

* * * * *